US006593532B1

(12) United States Patent
Goldberg et al.

(10) Patent No.: US 6,593,532 B1
(45) Date of Patent: Jul. 15, 2003

(54) ELECTRODE LEAD WIRES

(75) Inventors: Howard V. Goldberg, Framingham, MA (US); Prabhat Kumar, Framingham, MA (US); Thomas Ryan, Canton, MA (US)

(73) Assignee: H. C. Starck, Inc., Newton, MA (US)

( * ) Notice: Subject to any disclaimer, the term of this patent is extended or adjusted under 35 U.S.C. 154(b) by 0 days.

(21) Appl. No.: 09/685,185

(22) Filed: Oct. 11, 2000

Related U.S. Application Data
(60) Provisional application No. 60/158,726, filed on Oct. 11, 1999.

(51) Int. Cl.$^7$ ................................................ H01B 7/00
(52) U.S. Cl. .................................................. 174/110 A
(58) Field of Search .................. 174/110 A; 361/308.3, 361/508.3, 509, 516, 528, 529, 532; 419/13, 30, 31

(56) References Cited

U.S. PATENT DOCUMENTS

| 3,825,802 | A | * | 7/1974 | Kumagai et al. ........... 361/529 |
| 5,680,292 | A | * | 10/1997 | Thompson, Jr. et al. .... 361/528 |
| 5,825,611 | A | * | 10/1998 | Pozdeev ..................... 361/524 |
| 6,338,816 | B1 | * | 1/2002 | Fife ........................... 148/206 |

* cited by examiner

Primary Examiner—Chau N. Nguyen
(74) Attorney, Agent, or Firm—Godfried R. Akorli; Diderico van Eyl

(57) ABSTRACT

Electrolytic capacitor lead wires doped with one or more interstitial elements at the surface to enhance (lower) leakage of capacitors using such lead wires.

11 Claims, 2 Drawing Sheets

ELECTRODE LEAD WIRES

FILED OF THE INVENTION

The present invention relates to capacitor electrode lead wires for anodes of electrolytic capacitors. This application has 35 U.S.C. § 119 priority from our provisional application Ser. No. 60/158,726, filed Oct. 11, 1999.

BACKGROUND OF THE INVENTION

The advancing electrolytic capacitor industry has, at its premium level, increasing capacitances per units of volume and weight of the sintered powder porous compacts anodes (usually refractory metal powders, preferrably tantalum powder) that constitute the anode of the capacitor. This performance enhancement is characterized by fine powder sizes, miniaturization of the compact as a whole and selected additives to the tantalum powders to enhance capacitor performance and/or the manufacturing process regarding one or more of capacitance, sinterability and resistance to electrical leakage and voltage breakdown. Known additives for one or more of such purposes include phosphorous, silicon, nitrogen and other elements.

Improvements in electrical leakage have been made through improvements of anode compacts per se. The present invention has as a principal object enhancement of leakage characteristic (reduction) through modification of lead wire chemistry.

SUMMARY OF THE INVENTION

The present invention provides a method of enhancing (lowering) leakage of capacitors by modifying the lead wire surface by doping with one or more interstitial elements such as nitrogen, oxygen or silicon.

The doping can be practiced by placing a finished wire into a gaseous atmosphere containing a sufficiently high concentration of the interstitial element(s) and heating for driving the element(s) into the wire surface. The interstitial element(s) can also be introduced into the bulk of the wire (at wire stage or at an earlier stage of fabrication) and then segregated to near the surface. It has been discovered that capacitor leakage can be reduced using such modified lead wires.

The interstitial element(s), if provided in too high a concentration throughout the wire bulk can have a deleterious effect. But surface doping can achieve leakage enhancement without adverse mechanical effect.

The lead wire is bonded to a sintered powder porous anode of the type used for electrolytic capacitors.

Other objects, features and advantages will be apparent from the following detailed description of preferred embodiments taken in conjunction with the accompanying drawings in which:

DETAILED DESCRIPTION OF PREFERRED EMBODIMENTS

The following examples of practice of the invention illustrates its practice.

Tantalum wire was placed in a furnace chamber that was evacuated and backfilled with argon. The chamber had magnesium chips (provided for deoxidation function). The furnace chamber was heated to 900° C. for two hours. The chamber was then cooled to room temperature, then reheated to 350° C., pressurized to 1 psig with a 20% nitrogen, 80% argon mixture, held under that temperature and atmosphere condition for 30 minutes and then cooled to room temperature. This was a nitriding treatment.

Figure 1:
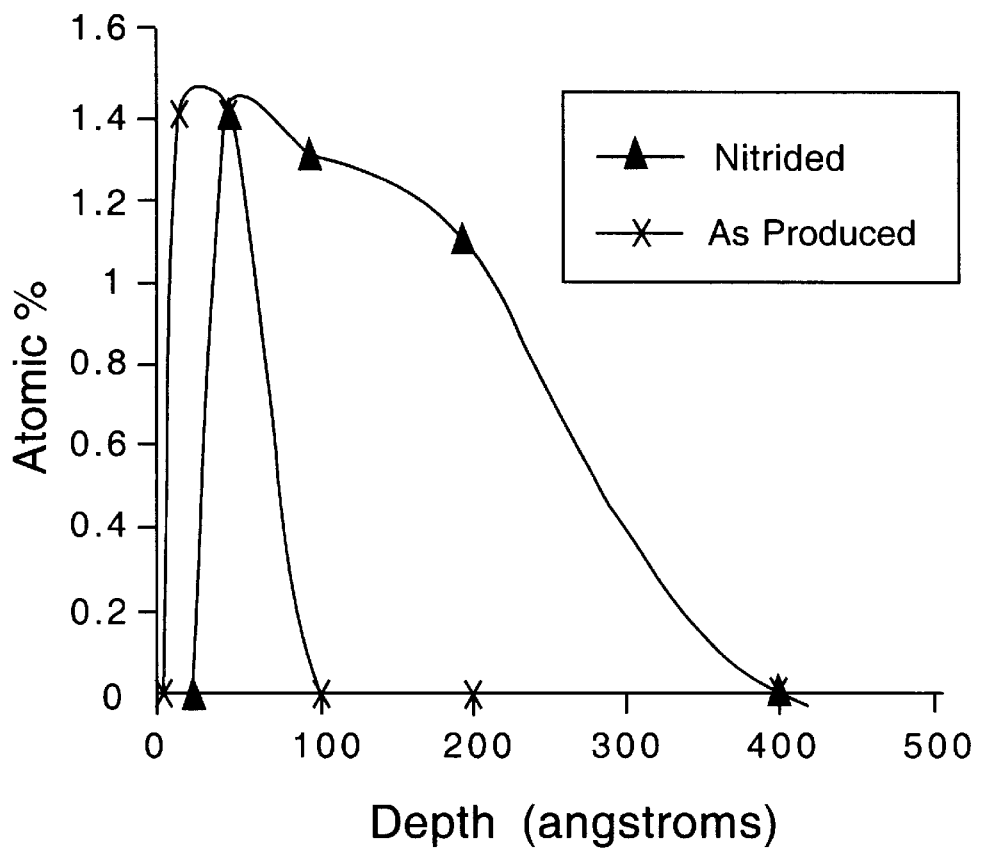
FIG. 1 is a graph of element doping at a wire surface and declining radially inward.
Figure 2:
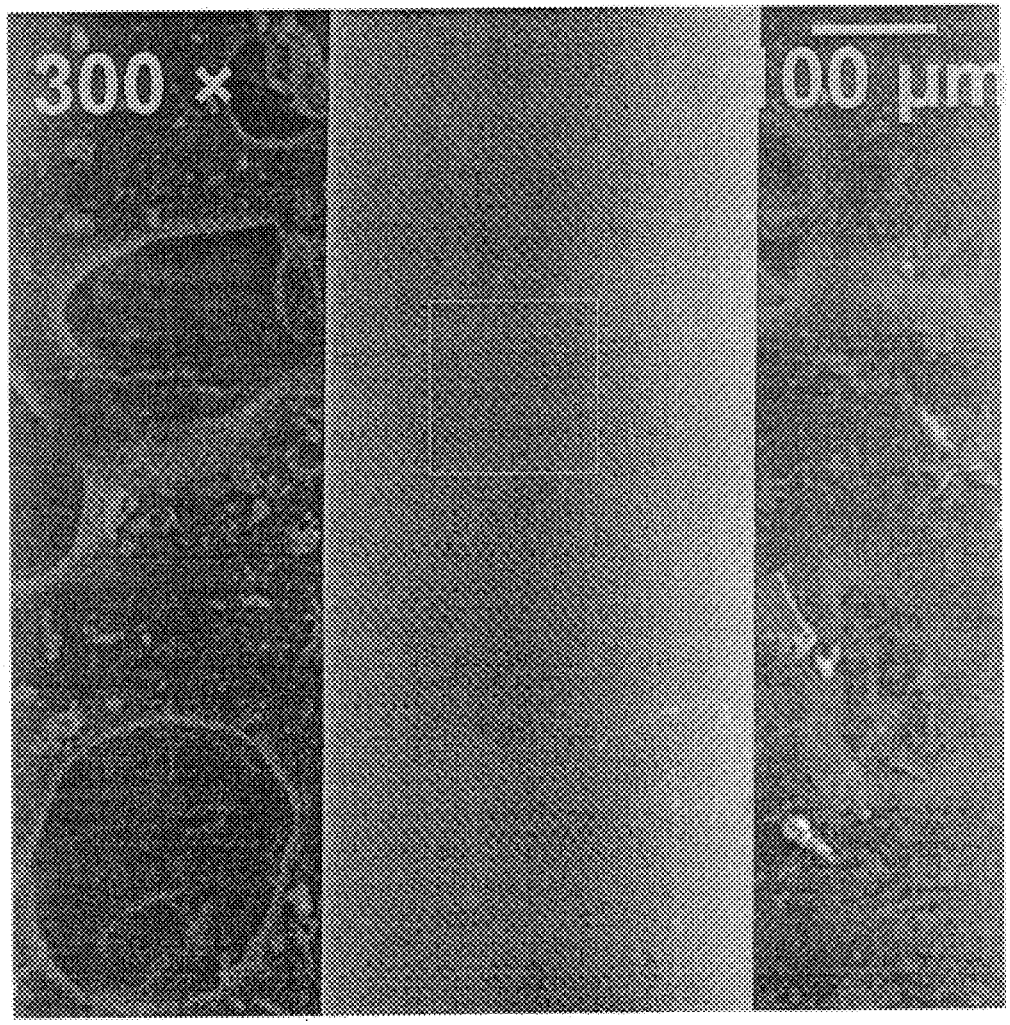
FIG. 2 is a picture of a wire made in accordance to the invention.

Samples of the wire as produced without the above treatment and as so treated (nitrided) were measured for nitrogen profile from the surface and the amount of nitrogen (atomic-%) at several depths from the surface (in Angstroms) was measured and plotted giving the profiles shown in FIG. 1 (atomic % vs. depth). The as-produced wire had a spiked concentration of over 1.0 atomic percent within 100 Angstroms and well below 0.1% at 100 Angstroms while the nitrided wire had over 1 atomic percent down to about 200 Angstroms and over 0.2% at 300 Angstroms.

The as-produced and nitrided wires were bonded to similar anodes that were then fabricated into test capacitor systems and tested for capacitance and leakage. The leakage of the test capacitor systems using the as-produced wires averaged 1.011 $\mu A/in^2$ and leakage of the test capacitor systems using the nitrided wires averaged 0.5335 $\mu A/in^2$.

The process of surface nitriding (nitrogen surface doping) and/or doping with other interstitials can be applied with benefit to lead wires of various refractory metals, including tantalum as in the above example, niobium, niobium-tantalum alloys, titanium, tantalum-titanium alloys, zirconium, hafnium and other refractory metal elements and alloys. The capacitor anodes can also be made from a similar range of refractory metals.

The interstitials to be enhanced (doped) at wire surface can include nitrogen, silicon, oxygen and other interstitials singly or in combinations. They can also be employed in combination with other elements and compounds employed at the wire bulk and/or surface to enhance mechanical properties.

The lead wire can be of round or other forms, e.g. ribbon form for use with flat chip like anode compacts.

The present invention thus provides a method of producing capacitor anodes of refractory metals with bonded refractory metal lead wires (and resultant anode/wire assemblies and capacitors incorporating the same) using wires with surfaces of substantially enhanced interstitial content. Such enhancement provides a significant reduction of electrical leakage and can increase the production yields of high quality capacitors.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Refractory metal electrode lead wire comprising a surface doped with interstitial to a concentration of interstitial elements substantially in excess of bulk concentration of such elements limited to within about 200 Angstroms.

2. Electrode lead wire as recited in claim 1 wherein the wire is selected from the group consisting of tantalum and niobium.

3. Electrode lead wire as recited in claim 2 wherein the doping element is nitrogen.

4. Electrode lead wire as recited in claim 1 in bonded combination to an electrolytic capacitor porous anode.

5. Method of lowering leakage of a capacitor containing a capacitor anode-lead wire assembly by doping the lead wire with an interstitial element within 200 Angstroms of wire surface that will contact the anode.

6. Method of claim 5 wherein nitrogen is the selected interstitial.

7. Method of either of claim 5 or 6 wherein the wire is selected from the group consisting of tantalum and niobium.

8. A method of lowering leakage of a capacitor containing a capacitor anode-lead wire assembly comprising doping the lead wire with an interstitial element within 200 Angstroms of wire surface that will contact the anode, wherein the lead wire is subjected to a deoxidation treatment immediately followed by interstial element doping treatment to establish the limited depth doping of 200 Angstroms.

9. The method of claim 8, wherein the wire is selected from the group consisting of tantalum and niobium.

10. A method of lowering leakage of a capacitor containing a capacitor anode-lead wire assembly comprising doping the lead wire with an interstitial element within 200 Angstroms of wire surface that will contact the anode, wherein nitrogen is the selected interstitial, wherein the lead wire is subjected to a deoxidation treatment immediately followed by interstial element doping treatment to establish the limited depth doping of 200 Angstroms.

11. The method of claim 10, wherein the wire is selected from the group consisting of tantalum and niobium.

* * * * *